United States Patent [19]
Anand et al.

[11] Patent Number: 5,974,416
[45] Date of Patent: Oct. 26, 1999

[54] METHOD OF CREATING A TABULAR DATA STREAM FOR SENDING ROWS OF DATA BETWEEN CLIENT AND SERVER

[75] Inventors: Thulusalamatom Krishnamurthi Anand, Bellevue; Peter A. Tucker, Redmond; John G. Bennett, Clyde Hill; Kamaljit S. Bath, Bellevue; Raja Krishnaswamy, Redmond, all of Wash.

[73] Assignee: Microsoft Corporation, Redmond, Wash.

[21] Appl. No.: 08/966,670

[22] Filed: Nov. 10, 1997

[51] Int. Cl.[6] ........................................... G06F 17/30
[52] U.S. Cl. ..................... 707/10; 707/3; 707/4; 707/100
[58] Field of Search ............... 707/10, 3, 4, 100

[56] References Cited

U.S. PATENT DOCUMENTS

| | | | |
|---|---|---|---|
| 5,778,377 | 7/1998 | Marlin et al. | 707/10 |
| 5,819,263 | 10/1998 | Bromley et al. | 707/3 |
| 5,870,759 | 2/1999 | Bauer et al. | 707/10 |
| 5,870,765 | 2/1999 | Bauer et al. | 707/10 |
| 5,884,325 | 3/1999 | Bauer et al. | 707/10 |

*Primary Examiner*—Paul V. Kulik
*Assistant Examiner*—Jean M. Corrielus
*Attorney, Agent, or Firm*—Christensen O'Connor Johnson & Kindness PLLC

[57] ABSTRACT

A method and tabular data stream format is provided for the transmission of tabular data between a client process running on a client computer and a server process running on a server computer via a network such as the Internet. The tabular data stream format, called the Advanced Data TableGram (ADTG) format, is ideally suited for marshaling tabular data in both directions between a Web browser and a Web server. A Web browser query is processed by the Web server retrieving tabular data from a database and converting the data into a Rowset. The Rowset, in turn, is formatted into an ADTG message. The ADTG message includes a Header section, a HandlerOptions section, a Row section, and an End section. The Header section includes data representing global parameters for a tabular data stream. The Handler Options section contains data representing parameters for controlling the processing of the tabular data stream by a process receiving the tabular data stream. The Descriptors section includes data representing properties of the tabular data stream. The Row section includes data representing the properties of rows and values of the columns of the tabular data stream. The End section contains data that denotes the end of parts of an ADTG message, called resultsets, or the end of the entire ADTG message.

53 Claims, 8 Drawing Sheets

Column Descriptor Table

| Data Type | Name | Nullable | Description |
|---|---|---|---|
| UI2 | wResultColumnOrdinal | N | Ordinal of the column in the resultset. It begins at 1, no Bookmark shall occur. Columns that were not included in the original query but are part of the tablegram (like the primary key and timestamp columns for keyset implementations) are always sent after all the visible columns. Hence, the ordinal for such columns is greater than the nVisibleColumns value in the adtgResultset-Descriptor token. |
| L'UI2' | wFriendColName | Y | The friendly name of the column. |
| UI2 | wTableOrdinal | Y | Identifies the base table that the column belongs to. Must match the ordinal number in adtgTableDescriptor. For computed columns, it is NULL. |
| UI2 | wBaseColOrdinal | Y | Ordinal of the column in the base table, if available. For computed columns, it is NULL. |
| L'UI2' | wOriginColName | Y | It contains the original column name. It may be the base column name of the base table depending on the type of object that generated the TableGram. This value is supplied only when the friendly name is different from the original column name. Otherwise, the friendly name of the column is same as the original column name. |
| DBID | dbidColumnID | Y | The persistent or underlying identifier or name for the column[1]. This is a nullable column in the TableGram to support providers that may not implement persistent Column IDs. |
| DBTYPE | wType | N | The OLE DB data type of the column |
| ITypeInfo | pTypeInfo | Y | Reserved for future use. Providers should return a null pointer in pTypeInfo. |
| UI4 | dwMaxLength | N | Fixed length of the type measured in UI1s, or the maximum length. ~0 if no defined maximum length for the data type or greater than 2^32-1 UI1s. |

*Fig.6A.*

| Data Type | Name | Nullable | Description |
|---|---|---|---|
| UI4 | wPrecision | N | Number of overall digits if NUMERIC type. If the data type is not numeric, this is NULL. |
| I4 | wScale | N | A NUMERIC type is encoded as an integer. Divide that integer by 10^Scale to arrive at the underlying value. Scale may be negative. If the data type is not numeric, this is NULL. |
| DBCOLUMN FLAGS[2] | fIsBookMark fMayDefer fWrite fWriteUnknown fIsFixedLength fIsNullable fMaybeNull fIsLong fIsROWID fIsROWVER fCacheDeferred | N | FALSE: Bookmark columns are not supported<br>*FALSE: see note 1*<br>Specifies if the column value can be updated<br>TRUE if it is not known whether value may be updated<br>TRUE if all data in the column has the same length<br>TRUE if NULL may be written to the column<br>TRUE if NULL may be read from the column<br>TRUE if the column contains a BLOB that contains very long data. The definition of very long is provider-specific.<br>TRUE if the column contains a persistent row identifier<br>TRUE if the column contains timestamp or other version info<br>*FALSE: see note 2* |
| L'UI2' | wBaseCatalog-Name | Y | The name of the catalog in the database that contains the column. |
| L'UI2' | wBaseSchema-Name | Y | The name of the schema in the database that contains the column. |
| I4 | dwCollating-Sequence | Y | An OLE LCID[3]. The default is the code page installed on the server machine |
| I4 | dwComputeMode | Y | COMPUTED, DYNAMIC, or the default NOTCOMPUTED |
| UI4 | dwDateTime-Precision | Y | Precision (number of digits in the fractional seconds portion) if column is a datetime or interval type. |
| VARIANT | vntDefaultValue | Y | Contains the default value for the column being described, if it has been declared statically |

*Fig.6B.*

| Data Type | Name | Nullable | Description |
|---|---|---|---|
| L'UI2' | wDomainCatalog | Y | The name of the catalog containing the column's domain. |
| L'UI2' | wDomainSchema | Y | The name of the schema containing the column's domain. |
| L'UI2' | wDomainName | Y | The name of the domain of which the column is a member. NULL if the domain name cannot be determined. |
| BOOL | bIsAutoIncrement | Y | TRUE if new values get assigned automatically to the column in fixed increments |
| BOOL | bIsCaseSensitive | Y | TRUE if the order and searches on the column are case sensitive |
| BOOL | bIsMultivalued | Y | TRUE if the column can have more than one value per row. It may be returned as a vector of pointers to an array of values. |
| UI4 | dwIsSearchable | Y | Is a bitmap containing values to indicate the kind of search operations that can be performed on the column[4] |
| BOOL | bIsUnique | Y | TRUE if the column is defined to be unique for each row of data in the table |
| UI4 | dwOctetlength | Y | Minimum length in octets (bytes) of the column, if column is a character or binary type. |
| BOOL | bIsVisible | N | TRUE for all columns that were in the selection list in the original query; FALSE for extra columns generated for the query (like the key columns in a keyset) |

*Fig.6C.*

METHOD OF CREATING A TABULAR DATA STREAM FOR SENDING ROWS OF DATA BETWEEN CLIENT AND SERVER

FIELD OF THE INVENTION

The present invention relates to the field of data transfer and, more particularly, to transferring tabular data over a network.

BACKGROUND OF THE INVENTION

Much of the Internet's use is conducted through the World Wide Web, hereinafter referred to as "WWW," or simply the "Web," in which linked pages of static content, composed of a variety of media, such as text, images, audio, and video, are described using hypertext markup language (HTML). While the WWW revolution has placed a wealth of information at the fingertips of cotuntless people, and while HTML is a very good way of describing static documents, HTML provides no mechanism for interacting with Web pages. At present, a Web browser uses the Hypertext Transport Protocol (HTTP) to request an HTML file from a Web server. HTTP is an Internet protocol designed for the rapid and efficient delivery of HTML documents. A Web browser is a client process (also called a "client") running on a local or client computer that enables a user to view HTML documents. An examples of a Web browser is the Internet Explorer, from Microsoft Corporation, of Redmond, Washington. A Web server is a server process (also called a "server") running on a remote or server computer that uses HTTP to serve up HTML docuinents and any associated files and scripts when requested by a client.

The Web server receives the request and sends the HTML page to the Web browser, which formats and displays the page. Although this model provides a client with ready access to nicely formatted pages of information, it provides only limited interaction between the client and the server. In this regard, HTML pages must be manually edited in order to change what a server sends to a client. Thus, much of the potential richness of the World Wide Web is not fully realized.

One of the biggest challenges to any Web server is to offer client's dynamic content, such as selected information retrieved from databases. A prior art approach to providing dynamic content in Web pages is through the use of the Common Gateway Interface (CGI). CGI is a common way for interfacing external applications with HTTP or Web servers in which a client, executing a CGI script embedded in an HTML page, sends a request to the Web server to execute a CGI program. The CGI script transfers environment variables comprising a query string and a path information parameter. The query string is a string of text to be searched for in the Web server's database file. The path information parameter is used to indicate the location of a file to be searched.

While CGI allows specifically requested information to be accessed from databases across the Internet, CGI has very limited capabilities. Queries performed by CGI programs amount to string matching in a data file, and the results returned to the Web browser are simply preformatted text or an HTML document listing the results. Information retrieved by CGI programs is not tabular in nature. Any tabular relationships that might have been present in the data file are lost because tabular relationships are not accommodated by CGI. Thus, CGI, while adding dynamic content to Web pages, falls short of providing the full potential of database technology through the Internet. The present invention is directed to overcoming the problem.

SUMMARY OF THE INVENTION

In accordance with the present invention, a method and tabular data stream format for retrieving information from, and updating data to, a database through a disconnected network, such as the Internet, is provided. The invention achieves this result by defining a tabular data stream format ideally suited for marshaling tabular data for transfer between clients and servers coupled together via a disconnected network. Marshaling is the process of packaging up the data so that when it is sent from one process to another, the receiving process can decipher the data. The tabular data stream format, called the Advanced Data TableGram (ADIG) format, is especially suitable for marshaling tabular data for transfer in both directions between a client, such as a Web browser, and a Web server using the HTTP. The marshaled resultsets of database queries, i.e., table rows containing updates made to them by applications, and status information for each row that contained the changes, are converted into an ADTG message, i.e., a message formatted in accordance with ADTG.

In accordance with the present invention, when a client accesses a server through, for example the Internet, a query is sent as a method call requesting the execution of a method of a business automation object. The business automation object must be instantiated on the server computer. Most Internet server computers are protected by firewalls, which are barriers that filter data packets based on certain criteria, such as the type of packet, and/or based on an Internet address. Only certain types of data packets, such as HTTP packets, can pass through the firewall to the server computer. Since a business automation object cannot be accessed directly over the Internet, a protocol such as the Simple Object Access Protocol (SOAP) is required.

SOAP is the subject of U.S. patent application Ser. No. 08/967,082, filed on Nov. 10, 1997, titled "A Simple Object Access Protocol," by Alexander Stojanovic, et al., and assigned to Microsoft Corporation of Redmond., Washington, the assignee of the present invention, the subject matter of which is hereby incorporated herein by reference. SOAP is an application layer protocol that is layered on top of HTTP and allows business automation objects to be accessed and methods to be invoked over the Internet through Web servers. "Application layer" refers to the highest layer in the seven-layer Reference Model for Open Systems Interconnection (OSI Reference Model), an international standard for networking by the International Standards Organization (ISO). SOAP takes information necessary for making the method call, including the name of the business automation object, the method name, and any input parameters, and packages them into an HTTP POST message encoded as multipart MIME packets. MIME, which stands for Multipurpose Internet Mail Extensions, is an extension to the traditional Internet Mail protocol to allow for multimedia electronic mail. MIME was developed to accommodate electronic mail messages containing many parts of various types such as text, images, video, and audio. MIME is defined in Document RFC 1521 of the Network Working Group, Sept. 1993, which is hereby incorporated herein by reference. When the HTTP POST message is received by the server, it is unpackaged in accordance with SOAP, the object is instantiated, and the method is invoked to perform a database query.

In accordance with the present invention, client queries are received by a server and processed. The result of the processing is converted into a Rowset, which is a self-describing format that includes not only the result data, but also information concerning the data (metadata) such as the tables and columns that the data was drawn from, the query that generated the results, etc. The Rowset, in turn, is formatted in ADTG. The ADTG message is sent back to the client, using SOAP, which recreates the resultset. In addition to receiving query results from the server, the client can update the database using an ADTG message containing both the updated data and the original data.

A Rowset is an interface for accessing and manipulating data. One example of software that includes a suitable Rowset is OLE DB by Microsoft Corporation of Redmond, Washington. OLE DB is a set of interfaces for performing various database management services. It extends Microsoft's Open Database Connectivity (ODBC), which provides access to relational databases, to all types of data and all types of databases. The OLE DB specification is described in *Microsoft OLE DB 1.1 Programmer's Reference and Software Development Kit*, Microsoft Press, 1997, and is hereby incorporated by reference. ODBC 3.0 is described in *Microsoft ODBC 3. 0 Software Development Kit and Programmer's Reference*, Microsoft Press, 1997, and is hereby incorporated by reference.

In accordance with other aspects of this invention, the Advanced Data TableGram (ADTG) format includes a Header section, a HandlerOptions section, a Descriptors section, a Row section and an End section. The Header section includes data representing global parameters for a tabular data stream. The HandlerOptions section contains data representing parameters for controlling the processing of the tabular data stream by a process receiving the tabular data stream. The Descriptors section includes data representing properties of the tabular data stream. The Row section includes data representing the properties of rows and values of the columns of the tabular data stream. The End section contains data that denotes the end of parts of an ADTG message, called resultsets, or the end of the entire ADTG message.

In accordance with further aspects of this invention, each section includes one or more tokens, each of which includes a plurality of fields.

In accordance with still further aspects of this invention, the Descriptor section includes: (i) a token having fields containing data representing the general properties of the tabular data stream, (ii) at least one token having fields containing data representing the properties of tables from which the tabular stream originated, and (iii) at least one token having fields containing data representing the properties of columns of the tabular data stream.

In accordance with still other aspects of this invention, the Rows section includes: (i) at least one token having fields containing data representing the properties of a row of the tabular data stream; and (ii) at least one token having fields containing data representing the values of columns of the row of the tabular data stream.

In accordance with yet further aspects of this invention, the Descriptors section comprises a 16-byte unique identifier.

As will be readily appreciated from the foregoing description, the invention includes a unique tabular data stream format called the Advanced Data TableGram (ADTG) that is ideally suited for marshaling tabular data for transfer between clients and servers coupled together via a network, such as the Internet. While intended for use in connection with the Internet, the invention can also be used with other types of local and wide area networks, both connected and disconnected.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 6A–C comprise a Column Descriptor Table based on the OLE DB IColumnsRowset.

DETAILED DESCRIPTION OF THE PREFERRED EMBODIMENT

Figure 1:
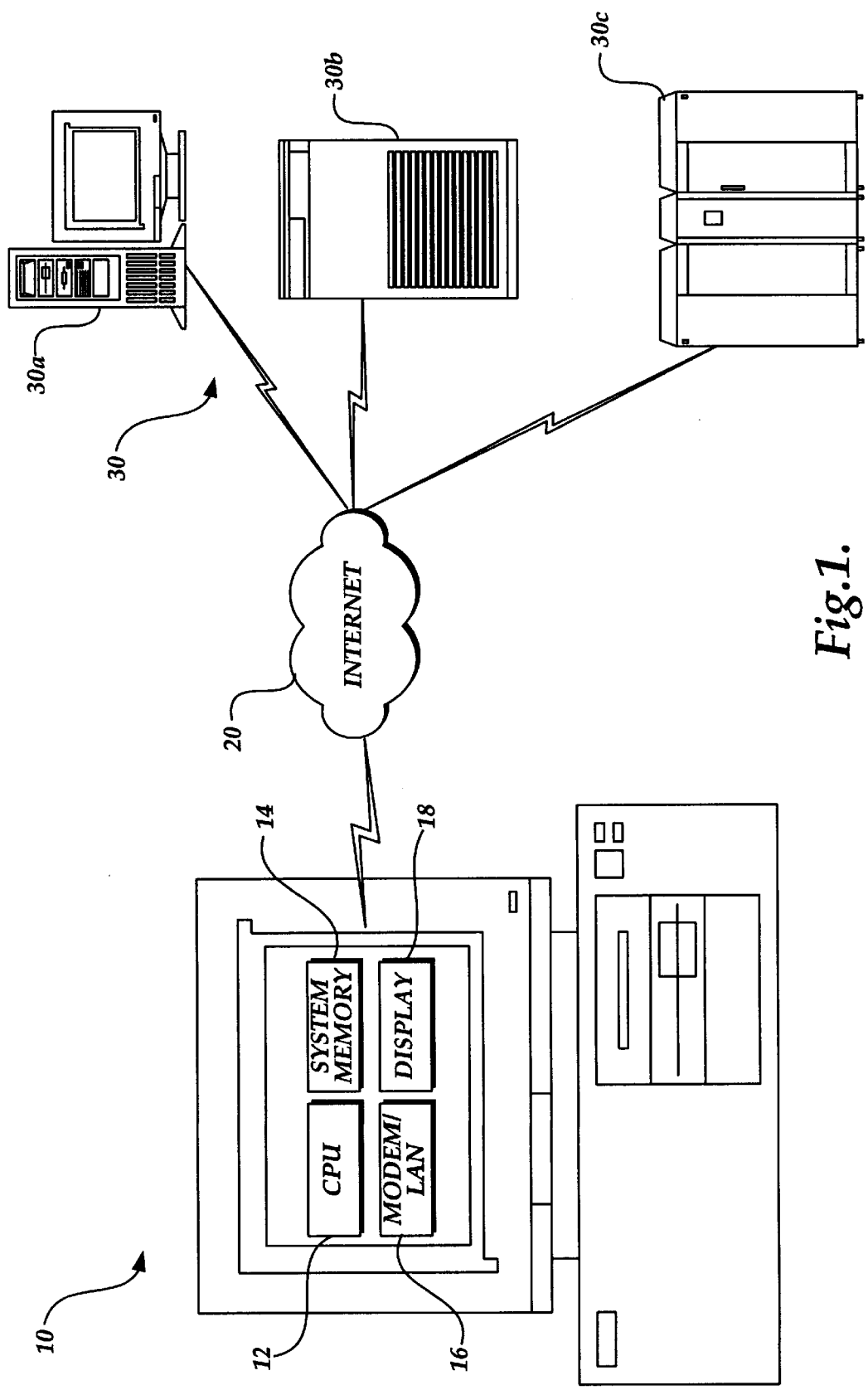
FIG. 1 is a pictorial diagram depicting the network environment in which the present invention operates.

As shown in FIG. 1 and as will be better understood from the following description, the present invention is intended for use in a system wherein a client process running on a local or client computer 10 (hereinafter collectively called "client") accesses and updates databases located on a remote or server computer 30 running a server process (hereinafter collectively called "server". The clients and servers are connected together through a network, such as the Internet 20. An example of a client process is a Web browser and an example of a server process is a Web server.

A typical local (client) computer 10 for implementing the invention is a general purpose computer, such as a conventional personal computer 10. As also shown in FIG. 1, personal computers include a central processing unit (CPU) 12, system memory 14, a modem or network card 16 for connecting the personal computer to the Internet 20, and a display 18, plus other components not specifically shown in FIG. 1, such as a keyboard, mouse, etc. While an exemplary local (client) computer is a general purpose personal computer 10, as will be readily appreciated by those skilled in the art, other types and configurations of computers may be used without departing from the spirit and scope of the invention. While typical remote (server) computers 30 are university or corporate mainframe computers 30c, server computers may take the form of host personal computers 30a or dedicated workstations such as minicomputers 30b.

Figure 2:
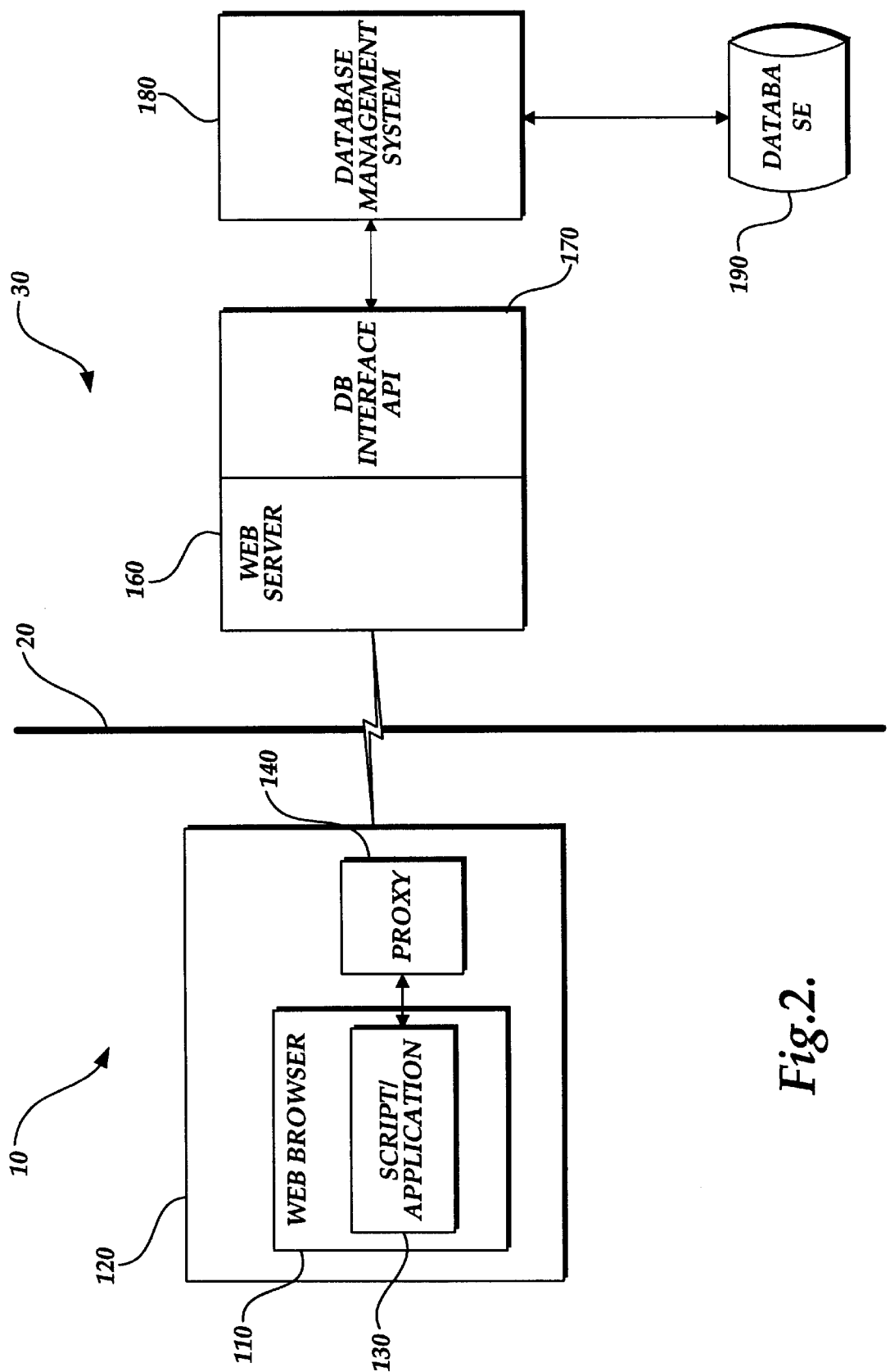
FIG. 2 is a block diagram showing a network incorporating the present invention.

Since all client and server computers will have, for the purposes of the present invention, the same properties, for simplicity of illustration and description, FIG. 2 and the following description illustrate and describe, respectively, the interaction between a single local (client) computer 10 and a single remote (server) computer 30. In this regard, as will be better understood from the following description, the present invention is preferably implemented as part of a computer program executing partially on a local (client) computer and partially on one or more remote (server) computers.

As shown in FIG. 2, running on the local (client) computer 10 is a client process, specifically, a Web browser 110. Running on the remote (server) computer 30 is a corresponding server process, specifically, a Web server 160. Embedded in the Web Browser 110 is a script or application 130. Running within the run-time environment 120 of the client computer 10 is a proxy 140 for packaging and unpackaging data packets formatted in accordance with the present invention. Connected to, and in communication with, the remote (server) computer 30 is a database management system (DBMS) 180, which manages access to a database 190. The DBMS 180 and database 190 may be located in the remote (server) computer itself, or may be located remotely on a database server (not shown). Running on the Web server 160 is a database interface Applications ProgrammrLing Interface (API) 170, which provides access to the DBMS 180.

As described above in connection with FIG. 1, the client computer 10 and the server computer 30 are connected to, and in communication with, each other through a disconnected network, such as the Internet 20. When the c.lient process, i.e., the Web browser 110, requests data from a database, the script or application 130 issues a query which is sent across the Internet 20 to the server computer 30, where it is interpreted by the server process, i.e., the Web server 160.

As is well known to those familiar with the Internet, communication between a client process and a server process is in accordance with the Hypertext Transfer Protocol (HTTP). Unfortunately, HTTP is not well-suited for remote access of objects. More specifically, while HTTP data packets are adapted to pass through the firewalls that often are used to protect client computers and server computers, business automation objects cannot be accessed directly over the Internet. In order to do so, it is necessary to layer a suitable application layer protocol on top of HTTP. One suitable application layer protocol is the Simple Object Access Protocol (SOAP), described in U.S. patent application Ser. No. 08/967,082, filed on Nov. 10, 1997, titled "A Simple Object Access Protocol" by Alexander Stojanovic, et al., the subject of which is incorporated herein by reference. While SOAP is the presently preferred application layer protocol, as those skilled in the art and others will readily appreciate, if the present invention is used in networks other than the Internet, or in situations where firewalls are not involved, SOAP may not be necessary, or an application layer protocol other than SOAP may be used. Even on the Internet, other application layered protocols, now existing or developed in the future, may be used. Hence, the invention should not be considered as limited to SOAP.

When the Web server 160 receives the query, the API 170 carries out the query by sending appropriate requests to the DBMS 180, which retrieves all rows of data from all the tables containing records satisfying the query. The rows from each table of the database from which data is retrieved are organized as Rtowsets by the API, marshaled into a single Advanced Data TableGram message, and sent to the client, as described more fully below. One suitable API is the AdvancedDataFactory object from Microsoft Corporation of Redmond, Washington, which includes the capability to run a query, create a Rowset, and update a database.

Figure 3:
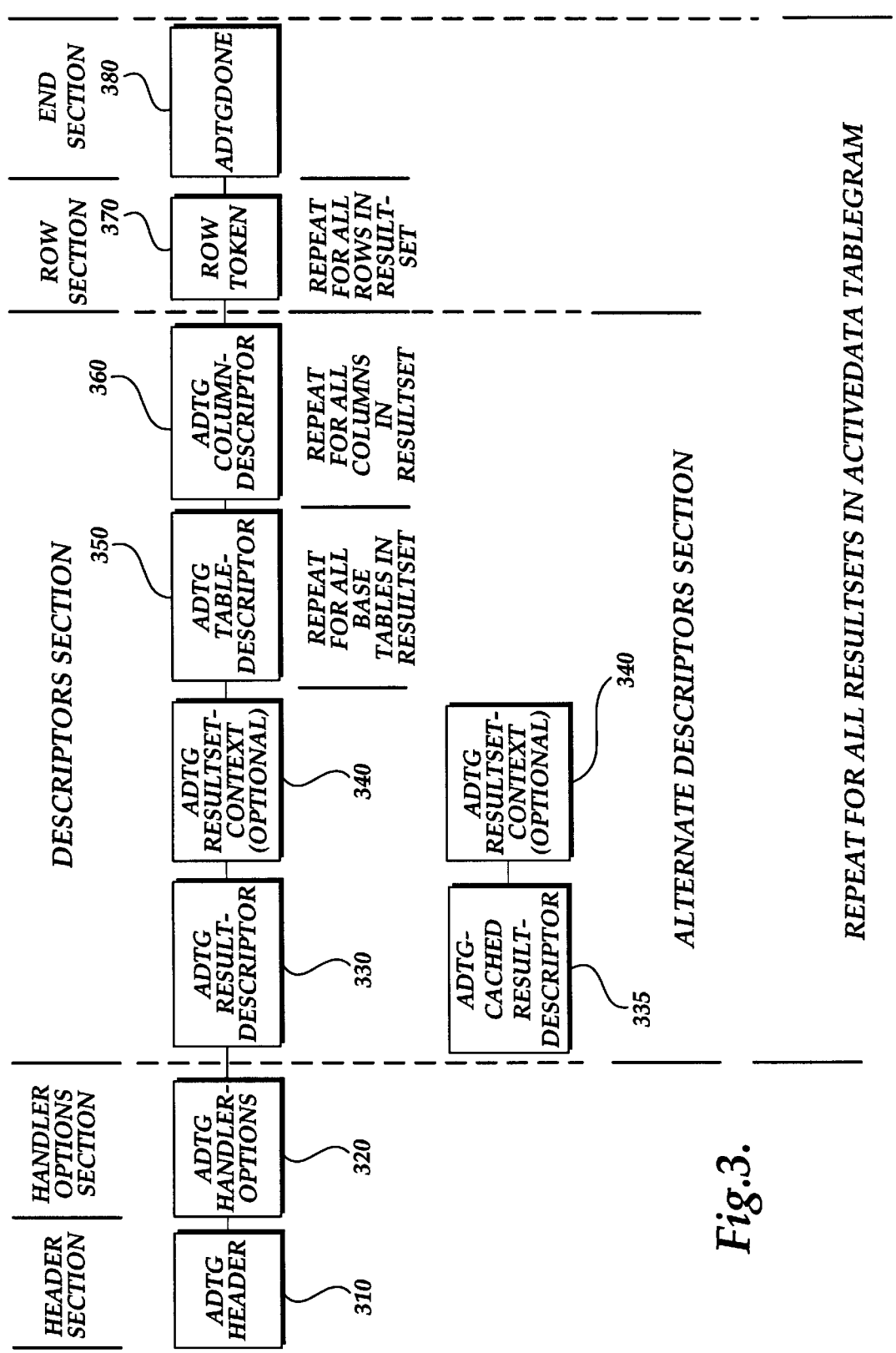
FIG. 3 is a block diagram depicting a tabular data stream format according to the present invention.

Referring to FIG. 3, an Advanced Data TableGram (ADTG) message formed in accordance with the present invention is constructed from tokens organized into five sections. The five sections, in order, are the Header, HandlerOptions, Descriptors, Rows and End sections. Each section comprises one or more tokens, and each token comprises one or more fields.

The Header section comprises a token designated the adtgHeader token 310. The adtgHeader token 310 establishes the global parameters of the ADTG message. The HandlerOptions section comprises a token designated the adtgHandlerOptions token 320. The adtgHandlerOptions token 320 immediately follows the adtgHeader token 310. The adtgHandlerOptions token specifies the options foi handling the ADTG message. The adtgHandlerOptions token 320 is used by the source (client or server) process generating the ADTG message to communicate certain behavior characteristics to the process receiving the ADTG message.

The Descriptors section includes three normally required tokens, designated the adtgResultDescriptor token 330, the adtgTableDescriptor token 350, and the adtgColumnDescriptor token 360, respectively, plus an alternate token designated the adtgCachedResultDescriptor token 335 and an optional token designated the adtgResultsetContext token 340.

The adtgResultDescriptor token 330, which immediately follows the adtgHandlerOptions token 320, describes the properties of the overall resultset.

The adtgTableDescriptor tokens 350 (there may be several) carry the name and general properties of the base tables involved in a query or update. One adtgTableDescriptor token 350 is included for each table, and all adtgTableDescriptor tokens follow immediately after the adtgResultDescriptor token 330.

The adtgColumnDescriptor tokens 350, one to carry the name and description of each column that appears in the ADTG message, follow the last adtgTableDescriptor token.

The adtgResultDescriptor, all adtgTableDescriptor, and all adtgColumnDescriptor tokens of a resultset may be replaced by a single adtgCachedResultDescriptor 335 token if the resultset description has been previously cached.

The optional adtgResultsetContext token 340 is used to marshal additional context that is not defined by other tokens. The adtgResultsetContext token allows Rowset providers to stream (add) information specific to their implementation that needs to be marshaled. If an adtgResultsetContext token is used, it appears immediately after adtgResultDescriptor or adtgCachedResultDescriptor, depending if the ADTG message is a normal or alternate message.

The next section of the ADTG message, which immediately follows the Descriptors section, is the Rows section. The Rows section includes Row tokens that contain row data preceded by an identifier that identifies the nature of the row data. The Row token identifiers include general purpose and specific purpose Row token identifiers.

The general purpose Row token identifiers include an identifier designated adtgOriginalResultsetRow or an identifier designated adtgOriginalBaseTableRow or an identifier designated adtgNormalizedRow. An adtgNormalihzedRow token contains compact information about the row being marshaled. This token only contains the data for the computed columns, along with row sequences identifying base table rows that have already been marshaled. This is a more compact way of sending resultsets when they are based on SQL join queries where rows from the parent table are repeated a number of times.

The specific purpose Row token identifiers include: a delete identifier designated adtgDelete; a change identifier designated adtgChange; an insert identifier designated adtginsert; and a read verify identifier designated adtgReadVerify.

As will be better understood from the following description, the general purpose and specific purpose Row token identifiers describe the type of row data contained in the related Row token. Row tokens may include bitmaps that contain information about the presence of nullable columns in the row being marshaled. The identifiers of such Row tokens are followed by the values of all the non-null columns of the row. These elements follow in the order specified by their column ordinals, which identify their relative positions in the row being marshaled. The elements are not preceded by any type identifier, since that is implied by the adtgColumnDescriptor token. The elements will only have a length part if they are not of a fixed width type.

The final section of an ADTG message is the End section, which includes a single token designated the adtgDone token 380. The adtgDone token indicates either the end of a resultset or the end of a complete ADTG message.

Each resultset includes one adtgResultDescriptor token, foll.owed by one adtgTableDescriptor for each base table in the resultset, followed by an adtgColumnDescriptor token for each computed column and/or base table column in the resultset. As shown in FIG. 3, an ADTG message that contains multiple resultsets is organized such that all data related to one resultset is transmitted before data related to the next resultset.

As will be readily appreciated from the foregoing description, the overall length of an ADTG message is unknown at its start. The end of each resultset is identified by the occurrence of an adtgDone token. As will be better understood from the following description, the final adtg-Done token of an ADTG message that contains more than one resultset includes a flag that specifies it is the last token in the ADTG message.

Tokens are present in the order illustrated in FIG. 3 and described above. Each ADTG message contains one adtg-Header and one adtgHandlerOptions token, followed by the tokens that make up the resultsets. As noted above, resultsets are made up of a sequence of Descriptors section, Row section and End section tokens. As also noted above, an ADTG message may contain more than one resultset streamed out one after the other in the order discussed above.

Figure 4:
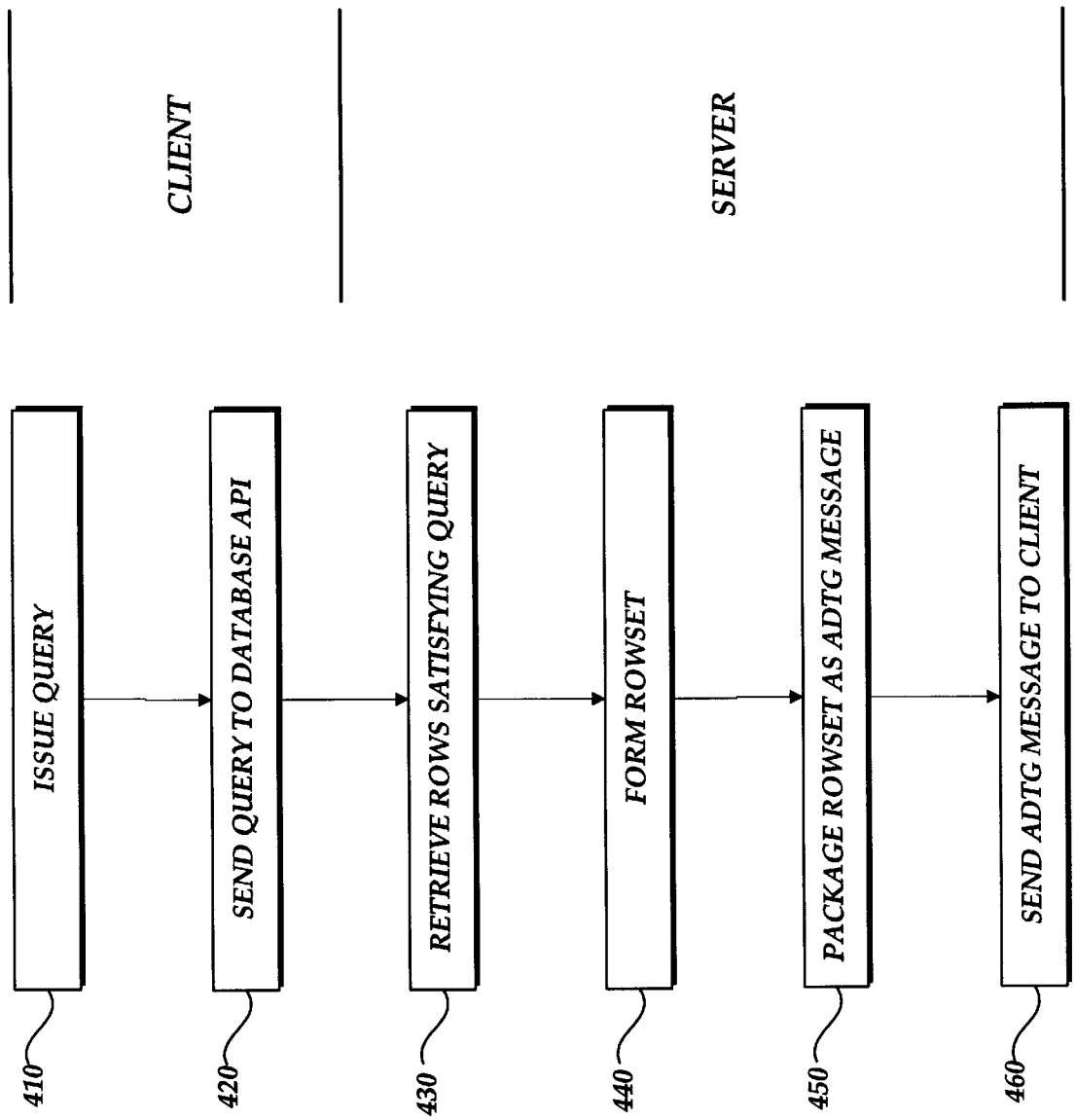
FIG. 4 is a functional flowchart depicting a method of retrieving, marshaling, and transferring tabular data according to the present invention.
Figure 5:
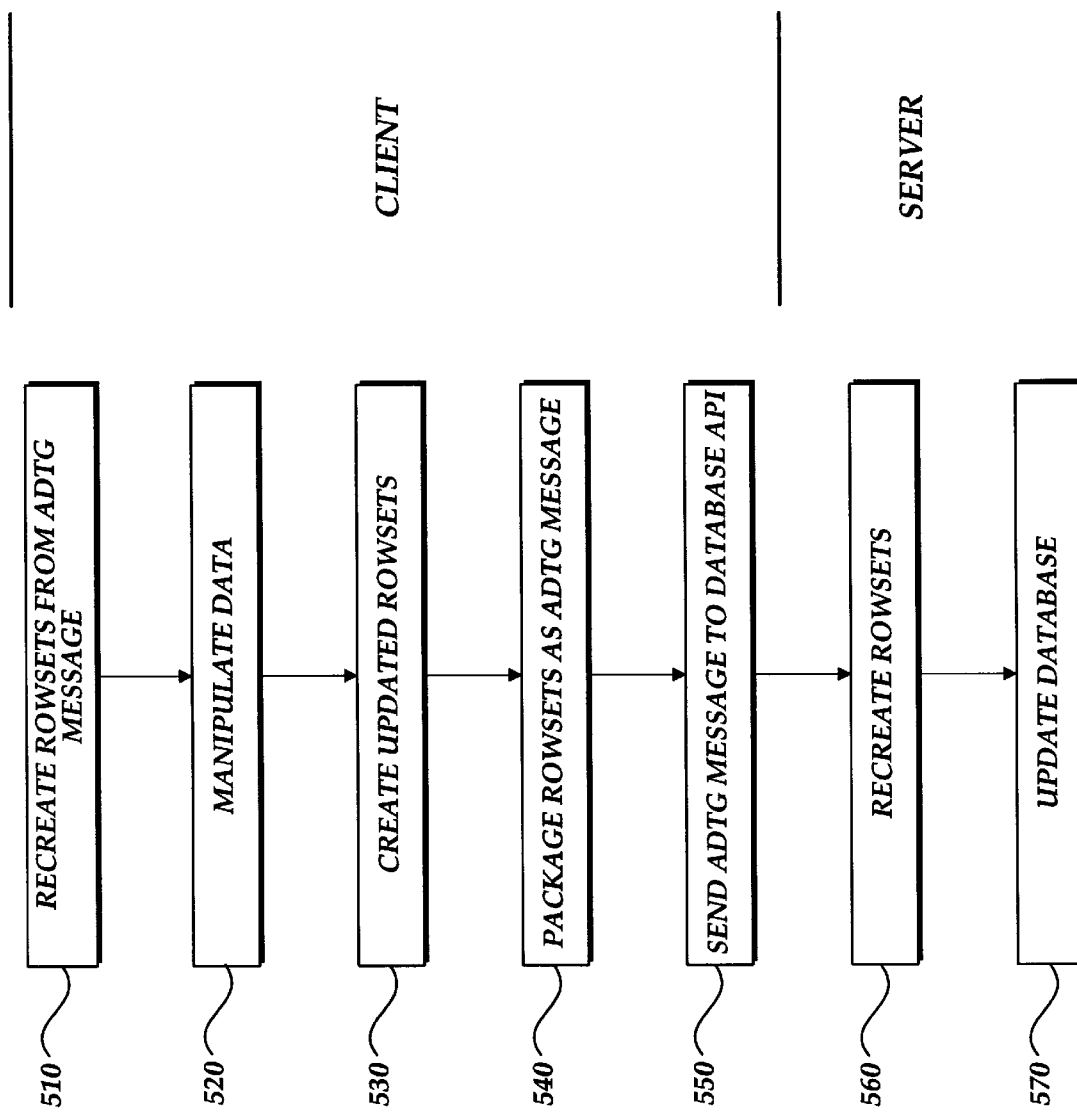
FIG. 5 is a functional flowchart depicting a method of updating a database according to the present invention.

FIGS. 4 and 5, respectively, depict methods for retrieving and updating tabular data across the Internet using ADTG messages, i.e., messages formatted in the manner described above.

The script or application 130 (FIG. 2), running within the client process, i.e., within a Web browser 110, on a client computer 10, first issues a database query. See Block 410 (FIG. 4). The query is marshaled across the Internet 20 to the Web server 160 running on the server computer 30. See Block 420. The database interface Application Processing Interface (API) 170 queries the database management system 180, and retrieves the rows of tables of the database 190 satisfying the query. See Block 430. The retrieved rows are converted into Rowsets at Block 440. The rowsets contain the actual row data as well as information (metadata) concerning the actual data. At Block 450, the Rowsets are converted into an Advanced Data TableGram (ADTG) message. Then the ADTG message is sent to the client. See Block 460.

Turning to FIG. 5, at Block 510, the proxy 140 (FIG. 2) unpackages the ADTG message and recreates the Rowsets containing the data that satisfies the client query. The client is then able to manipulate the data, if desired. See Block 520. If the data is changed, and the database needs to be updated as a result, updated Rowsets are created. See Block 530. At Block 540, the updated Rowsets are converted into an ADTG message by the proxy 140. The ADTG message is then sent to the database interface API 170. See Block 550.

The database interface API recreates the updated Rowsets and instructs the DBMS 180 to update the database 190. See Blocks 560 and 570.

In order for the invention to be better understood, the presently preferred component, i.e., the tokens and fields contained in the tokens that make up the various sections are described below. While presently preferred, it is to be understood that the tokens may include other fields and that the fields and the tokens may be organized in other manners, if desired, without departing from. the spirit and scope of the invention.

Header Section adtgHeader token

As noted above, the Header section is the first section of an ADTG message and includes a single token—the adtg-Header token 310. The purpose of the adtgHeader token is to establish global parameters for the ADTG message. For example, the adtgHeader token may include fields for: (i) indicating the length of the token; (ii) allowing software to confirm that data is correct; (iii) tracking updates to the format of ADTG messages; (iv) defining the byte ordering scheme used in the row data, and (v) defining the character encoding scheme used to transmit the resultset data. In one actual embodiment of the invention, the adtgHeader token includes the following fields:

| Field | Contents |
|---|---|
| wType | Identifies the following data to be of Header type. The value is fixed to be 'ADTG_HEADER'. |
| wLength | Contains the length of the rest of the adtgHeader token. It does not include the length of the wType and wLength fields. |
| wSignature | Used to allow software to confirm that it is looking at the correct data. Provides a simple guard against substitution of the wrong data or starting at the wrong position. |
| wAdtgVersion | Used to track the updates to the format of ADTG messages. |
| wByteOrder | Contains the byte ordering scheme used in the row data. 0 → Little Endian and 1 → Big Endian. Default is Little Endian. |
| fUnicode | Specifies the character encoding scheme used to transmit the resultset data. ADTG specific metadata is always sent in Unicode, but the actual row data can be sent in ASCII or Unicode. 0x00 - ASCII 0x01 - Unicode |

HandlerOptions Section adtgHandlerOptions Token

As noted above, the HandlerOptions section includes a single token—the adtgHandlerOptions token 320. The adtgHandlerOptions token contains fields that specify the options for handling an ADTG message. The adtgHandlerOptions token is used by the source process generating the ADTG message to communicate certain behavior characteristics to the process receiving the ADTG message. In one actual embodiment of the invention, the adtgHandlerOptions token includes the following fields:

| Field | Contents |
|---|---|
| wType | Indentifies the following data to be handler options The value is fixed to be 'ADTG_HANDLEROPTIONS'. |
| wLength | Contains the length of the rest of the adtgHandlerOptions token. It does not include the length of the type and length fields. |

-continued

| Field | Contents |
|---|---|
| CLSID | This is the ClassId of the object that is instantiated when the ADTG message is unmarshaled. The ClassId should already exist in the system registry of the local machine. The ClassId gives the source a way of having the data available at the target in a preferred format. |
| wUpdateTab GramType | This field states the information that should be sent in an update ADTG message. It is defined by the generator of the original ADTG message (for example, a business object or component running on the application program/middle tier). It can have on of the following values: 0x01 - Only send the changed columns of all the updated rows (the key and version columns will also be sent along with the updated columns in the updated rows); 0x02 - Only send the updated rows (the key and verision columns will also be sent along with the updated columns in the updated rows) but along with all the original values; 0x03 - Send all the initially selected rows (both updated and not) along with the original values for all updated columns. Whenever original values need to be sent, every adtgChange and adtgDelete token will be preceded by a corresponding adtgOriginalResultSetRow and/or atdgOriginalBaseTableRow token. They must be sent out in pairs, so that the complete original and updated state of the row can be re-created on the server side where a validation code may need to access it. |
| wOriginUrl | This optional URL field uniquely identifies the Table Handler that originated the table data being marshaled. It may be the name of a business object or component running on the application program/middle tier, or a datasource name that identifies an ODBC database instance or a filename that contains the data being worked upon. It contains enough information for the Unmarshaler to deliver the ADTG message to its recipient. It is supplied by the originator of the ADTG message and should not be modified by the client. |
| wUpdateUrl | This is an optional URL field that uniquely identifies the Table Handler that should handle the update ADTG message being marshaled. It may be the name of a business object or component running on the application program/middle tier, or a datasource name that identifies an ODBC database instance or a filename that contains the data being worked upon. If this field is no present, then the Origin URL is assumed to be the Update handler also. |
| wFriendlyName | This is an optional field that contains a friendly name identifying the default Table Handler. The server may supply this field for the client to use it in some User Interfaces that need to hide the underlying path and directory structure. |

Typically, an ADTG message is contained inside a Rowset object to be marshaled across process boundaries. The CLSID field is used to define the object that receives the ADTG message. The CLSID field may point to any user-defined object that knows how to unmarshal the ADTG message.

The CLSID field can be used to create an empty instance of th is object, in which case the un a rshaling component can load the data into it by cracking the ADTG message tokens. Kagera is the OLEDB provider for ODBC arid is described in the OLE DB specification, which has been incorporated herein by reference.

The wupdateTableGramType field allows server-side code that applies client updates to the underlying datasource to ask for a specific format for receiving updates. As noted, the options are to always receive the complete original Rowset, or to receive the completed updated rows, or to only receive the updated columns of the updated rows. The wUpdateTableGramType field can also specify, if need be, that all the original values should be sent along with updates.

ADTG messages have the option of making updates to a different datasource than the one which generated the data. As noted above, three (3) fields hold this kind of information—OriginUrl, UpdateUrl, and Friendly Name. The OriginalUrl is an optional field that uniquely identifies the originator of the ADTG message. The originator may be the datasource name, the name of an underlying flat file including its path, or the name of a business object or component running on an application program/middle tier such as the Transaction Server by Microsoft (Corporation of Redmond, Washington. Transaction Server is an Applications Programming Interface (API) that provides interfaces for executing applications across a network. The UpdateUrl is an optional field that the client can fill in when it wants the updates to be applied to a different datasource than the origin datasource. If this field is null, the updates are applied to the origin datasource. The server may also supply a friendly name for that Table Handler to the client to use in its User Interface dialog boxes etc. In cases when none of the URL fields are supplied (all three of them are optional), the client application and/or the server side component are assumed to be aware of the datasource names. They may communicate the datasource name among themselves using some method arguments, not part of this invention.

Descriptors Section

The Descriptors section includes, as noted above, a number of tokens: an adtgResultDescriptor token 330, an adtgResultsetContext token 340, an adtgTableDescriptor token 350, an adtgColumnDescriptor token 360, and an adtgCachedResultDescriptor token 335, all of which are described in detail below. As noted above, some of these tokens are optional and some are alternative.

adtgResultDescriptor token

The first token in the descriptors section is the adtgResultDescriptor token 330. The adtgResultDescriptor token describes the general composition of the resultset. In addition to type and length fields, the adtgResultDescriptor token includes a field for holding a Globally Unique Identifier (GUID), which is an autonomously generated 16-byte number that uniquely identifies the resultset. The GUID is used to cache the resultset description for later use. The adtgResultDescriptor token also includes fields for identifying the type of the cursor model represented by the resultset and specifying if row data can be marshaled in a normalized form, plus fields describing the columns and tables of the resultset. In one actual embodiment of the invention, the adtgResultDescriptor token includes the following fields:

| Field | Contents |
|---|---|
| wType | Identifies the following data to be a resultset descriptor. The value is fixed to be 'ADTG_RESULTDESCRIPTOR'. |
| wLength | Contains the length of the rest of the adtgResultDescriptor token. It does not include the length of the type and length fields. |
| guidResult-Descriptor | A GUID used to cache the resultset description for later use. |
| wCursorModel | Identifies the type of cursor model, represented by the resultset. The values of the wCursorModel are: 0x00 - Read-only Snapshot. The ADTG message may not contain key columns (only the columns that were explicitly selected). |

| Field | Contents |
|---|---|
| | 0x01 - Greedy Keyset. The ADTG message contains the key columns (even if they were not explicitly selected) and all the columns selected in the query.<br>0x02 - Keyset. The ADTG message contains only the key columns (even if they were not explicitly selected).<br>0 x03 - Updatable Snapshot. The ADTG message may not contain key columns (only the columns that were explicitly selected). All of the original values of the selected columns are used to identify the rows when submitting updates to the database. |
| wNormalized-Flag | Specifies if the row data can be marshaled in a normalized form. This form will be highly efficient when marshaling the results of a join query where the duplicate row data will be sent across the network only once even though the row appears multiple times in the resultset.<br>0x0 - Not Normalized<br>0x01 - Normalized |
| nVisible-Columns | Contains the number of columns in the original selection list of the query. These are columns that are explicitly selected for the resultset. |
| nTotalColumns | Contains the total number of columns in the resultset. It includes all the explicitly selected columns and the key and version columns selected for the keyset implementations. For snapshots, this count is the same as the nVisible-Columns. |
| nCompute-Columns | Contains the number of computed columns (those that are not persisted in any base table) in the resultset. |
| nTables | Contains the number of base tables involved in the SQL statement. In case of joins, identifies the number of tables being joined. If there was no join involved or in case of update TableGrams, contains the value 1. |
| nOrderBy-Columns | Contains the number of columns that the resultset is ordered by. |
| wOrderBy-Columns | An array that contains the ordinal numbers of the columns on which the resultset is to be ordered by. The column ordinals must match those specified in the column descriptors. |

In summary, the adtgResultDescriptor token describes the general properties of a whole resultset. The properties of the base tables involved in the resultset are contained in the adtgTableDescriptor token. For each resultset, there is one adtgResultDescriptor token, followed by one adtgTableDescriptor token for each base table, followed by adtgColumnDescriptor tokens for each computed column and base table columns. As noted above, ADTG message may contain multiple resultsets (which may be generated, for example, by a stored procedure). In this case, all the metadata and row data for one resultset is transmitted before the metadata and the row data for the next resultset.

The ADTG message is designed for efficient marshaling. The ADTG message format allows the message generator to specify the mechanism for transporting the row data over the network. In the most optimized case, suitable for resultsets containing one-to-many or many-to-many joins of multiple base tables, the duplicate rows are transported only once even though they appear multiple times in the resultset. A row sequence (generated during the marshaling and not persisted afterwards) is used to identify a row in a base table that has already been sent, every time the row appears again in the resultset.

If the recipient is capable of caching resultset descriptions, it can use the guidResultDescriptor token to unambiguously identify the resultset during later use. This is helpful when executing parametric queries where the metadata for the resultset does not change, only the data changes.

adtgCachedResultDescriptor token

The adtgCachedResultDescriptor token establishes a description of a resultset by referring to a cached identifier that contains all the metadata for the resultset. In addition to type and length fields, the adtgCachedResultDescriptor token includes a field that uniquely identifies a previously cached resultset description. In one actual embodiment of the invention, the adtgCachedResultDescriptor token includes the following fields:

| Field | Contents |
|---|---|
| wType | Identifies the following data to be a cached resultset descriptor. The value is fixed to be 'ADTG_CACHEDRESULTDESCRIPTOR'. |
| wLength | Contains the length of the rest of the adtgCachedResultDescriptor token. It does not include the length of the type and length field. |
| guidResult-Descriptor | A GUID that uniquely identifies a resultset description. |

If the requester and provider understand caching of resultst descriptions, then they may negotiate to use that technique. The specific parameters of the process are not within the scope of this invention. In such cases the resultset description is confirmed by the return of this token. The requester should previously have cached all the resultset description, including all table and column descriptors for the resultset.

As noted above, when this token occurs, none of adtgResultDescriptor, or adtgTableDescriptor, or adtgColumnDescriptor tokens appear. The next token in the stream is the first Row section token. The resultset descriptions may be cached in the system registry by the clients and servers. Alternatively, the CLSID of an object that exposes the desired columns information for all tables may be included in the ADTG message.

Some applications may require extended metadata to be reported (for example, OLAP apps) than what is passed in a standard ADTG message. In such applications, a GUID can be associated to a meta-table of such tables that contain all the extra metadata columns and their values.

As noted above, where caching is implemented, the ADTG message includes a single adtgCachedResultDescriptor token 335 in place of the adtgTableDescriptor, adtgTableDescriptor, and adtgColumnDescriptor sequence of tokens 350, 360 and 370. Thus, when an adtgCachedResultDescriptor token 335 is used, none of adtgResultDescriptor, adtgTableDescriptor, or adtgColumnDescriptor tokens appear. The next token in the data stream is the first token of the Row section.

adtgResultsetContext token

The adtgResultsetContext token 340 is an optional token that is used to marshal additional resultset context not defined by any of the other tokens. Rowset providers can use the adtgResultsetContext token to stream any information specific to their implementation that needs to be marshaled. The unmarshaling object on the receiving side is assumed to understand the context/property described by the adtgResultsetContext token. In addition to token identifier and length fields, the adtgResultsetContext token includes fields for: storing the number of option sets/property sets being defined in the resultset context, uniquely identifying the type of option/property set defined, identifying the number of options/properties defined within the option/property set, uniquely identifying the option/property being marshaled, and describing the value of the option/property being defined. In one actual embodiment of the invention, the adtgResultsetContext token includes the following fields:

| Field | Contents |
| --- | --- |
| wType | Identifies the following data to be a resultset context descriptor. The value is fixed to be 'ADTG_RESULTSETCONTEXT'. |
| wLength | Contains the length of the rest of the adtgResultsetContext token. It does not include the length of the type and length fields |
| nOptionSets | Contains the number of option sets/property sets being defined in the resultset context. |
| GuidOptionSet | A GUID that uniquely identifies the type of option/property set defined. |
| nOptions | Number of options/properties defined within this option/property set. This is equivalent to Property Ids within a Property Set. |
| wOptionId | This is a unique identifier that identifies the option/property being marshaled. |
| wOption | This is the value of the option/property being defined. |

One example of using the adtgResultsetContext token is in streaming a Transaction Id associated with a particular resultset. An adtgResultsetContext token can take an array of forms—containing a GUID field to define the type of option and a two-byte Unsigned Integer (UI2) field that contains the value of the specified option.

As noted above, the adtgResultsetContext token is an option token that may not be present in an ADTG message. If present, an adtgResultsetConiext token must not exist more than once for each resultset.

adtgTableDescriptor token

The adtgTableDescriptor token 350 is a token that describes the base table from which data is being retracted/updated. One adtgTableDescriptor token is used for each base table included in a resultset. The adtgTableDescriptor token includes fields containing details about individual tables involved in the generation of the resultset. More specifically, in addition to identifier and length fields, the adtgTableDescriptor token includes various fields, such as fields for: indicating the ordinal number of the base table; identifying the base table that generated the ADTG message; identifying the base table that is to be updated; indicating the codepage for user data; listing the number of columns in the table being described; identifying the number of columns that make up the primary key for the table; and describing the ordinal numbers of every column that makes up the primary key for the table. In one actual embodiment of the invention, the adtgTableDescriptor token includes the following fields:

| Field | Contents |
| --- | --- |
| wType | Identifies the following data to be a table descriptor. The value is fixed to be 'ADTG_TABLEDESCRIPTOR'. |
| wLength | Contains the length of the rest of the adtgTableDescriptor token. It does not include the length of the type and length fields. |
| wTableOrdinal | Ordinal number of the table. An ADTG message may contain interleaved data from multiple tables. The ordinal number is present in the row data to identify the table that row belongs to. The metadata for all tables precedes any row data in this case. |

-continued

| Field | Contents |
| --- | --- |
| wOriginTable-Name | A string that contains the name of the base table that generated the ADTG message. |
| wUpdate Table-Name | A string that contains the name of the base table to which the update is to be applied. |
| wCodePage | The default codePage is Latin1 (Code page value = 850 for Latin1, must be included in this field, by default). Note that codePage refers to user data. All metadata strings found in descriptors which are part of the ADTG message will be in UniCode. |
| nColumns | Contains the number of columns in the table being described. It includes columns that are selected to implement keyset cursors (which are not part of the original selection list). |
| nKeyColumns | Contains the number of columns that make up the primary key for this table. |
| wKeys | An array that contains the ordinal numbers of every column that makes up the primary key for this table. The ordinal number of the columns must match the ordinal number in the column descriptor. The key columns array must contain the key columns in the order that maintains their column ordinal positions within the base table. Thus, if the columns 3 and 5 of a base table form a key for it, then the first element of the array should refer to the 3rd column and the second element to the 5th column. |

As noted above, adtgTableDescriptor token is included for every base table that is involved in the resultset. The adtgResultDescriptor token contains details about the layout of the resultset, while the adtgTableDescriptor token contains details about individual tables involved in the generation of the resultset. In resultsets involving self-joins, the adtgTableDescriptor token is received twice just as in joins between different tables.

As will be readily appreciated from the foregoing description, an adtgTableDescriptor token contains information about the base table involved in the original query. It identifies the number of base table columns included in the resultset, name of the base table, and the columns that make up the primary key of the base table. It should be noted that for snapshots, the primary key columns information may be incomplete and hence not usable. For snapshots, only the columns that were in the original select list are included in the ADTG message, while for keysets all the primary key and timestamp columns are always included (if the underlying database supports the concept of keysets, otherwise just the columns that are part of the original select list are returned).

adtgColumnDescriptor token

The adtgColumnDescriptor token 360 describes one of the computed column of the resultset, or of a column of one of the base tables. All adtgColumnDescriptor tokens appear after the adtgTableDescriptor (or adtgCachedResultDescriptor) and adtgTableDescriptor tokens but before any row data for the related resultset. An adtgColumnDescriptor token is provided for every column that can appear in the rows of the table.

In addition to the type and length fields, adtgCachedResultDescriptor tokens include a bitmap field for indicating which columns of a row contain values, and which columns are nullable. In one actual embodiment of the invention, the adtgColumnDescriptor token contained the following fields:

| Field | Contents |
| --- | --- |
| wType | Identifies the following data to be a column descriptor. The value is fixed to be 'ADTG_COLUMNDESCRIPTOR'. |
| wLength | Contains the length of the rest of the adtgColumnDescriptor token. It does not include the length of the type and length fields. |
| wPresenceMap | Is a 3-byte bitmap that contains 1 bit for each nullable column in one row of the column descriptor table. This bit is set to 1 if a value is present in that column, or zero if the value is null. Note, in FIGURES 6A-C, that presenceMap is 3 UI1s because there are 21 bits needed for the permitted null columns. All bitmaps follow the little endian (left-to-right) ordering for fields being referred to. For example, the first byte of the wPresenceMap in the adtgColumnDescriptor token has the following detailed structure: presence bit for wFriendColName=0x80, for wTableOrdinal=0x40, for wBaseColOrdinal=0x20 and so on. |

The foregoing fields of the adtgColumnDescriptor token are followed by a row from a Column Descriptor table. The Column Descriptor table may, for example, be based upon OLE DB IColumnsRowset developed by Microsoft Corporation, Redmond, Washington. A suitable Column Descriptor table based thereon is shown in FIGS. 6A–C. When so based, the content of the Column Descriptor table is equivalent to an adtgOriginal row, except that the type field has value ADTG_COLUMNDESCRIPTOR. These descriptors are therefore themselves part of a metatable for which the row content is laid out in the same way as for an ordinary table which has the columns of an IColumnsRowset. The elements and the order of elements follows the General Rules for Row Data.

Each row of the Column Descriptor table describe a column in the underlying resultset. This includes the columns of the base table, computed columns in the original query, and any pseudo-columns generated by the datasource, such as primary keys, version columns, etc. Each column in the Column Descriptor table describes a single attribute, such as the name or data type, of a column in the original resultset.

Rows Section

As noted above, the Rows section follows the Descriptors section. The Row section includes tokens that begin with identifiers that identify the following data row. The identifiers may identify the data row as a general purpose data row or a special purpose data row. General purpose identifiers include: an identifier that identifies an original resultset row designated adtgOriginalResultsetRow; and an identifier that identifies an original base table row designated adtgOriginalBaseTableRow; and an identifier that identifies a normalized row designated adtgNormalizedRow. The Row token identified by the adtgNormalizedRow identifier contains compact information about the row being marshaled. As noted above, this token only contains the data for the computed columns along with row sequences identifying the base table rows that already have been marshaled, which is another way of representing general purpose row data. The special purpose identifiers include: an identifier that identifies a row of data to be deleted (i.e., nulled) designated adtgDelete; an identifier that identifies a row of data to be changed designated adtgChange; an identifier that identifies new data rows sent by a client to the datasource to be inserted into the datasource designated adtginsert; and an identifier that identifies a row of data to be read and verified designated the adtgReadVerity. Details of each of the Row tokens identified by these identifiers are set forth below.

As noted above, the Row token identifiers identify the type of the row data contained in a Row token. As will be better understood from the following description, Row tokens include bitmaps that have information about the presence of nullable columns in the row being marshaled. The values of all non-null columns of the row follow. These elements follow in the order specified by their column ordinals, which identify their relative positions in the row being marshaled. The elements are not preceded by any type identifier, since that is implied by the Column Descriptor, and will only have a length part if they are not of a fixed width type.

adtgOriginalResultsetRow Token

The adtgOriginalResultsetRow token is a general purpose token that identifies the row of data as one that matches the resultset layout. In addition to a type field, the adtgOriginalResultsetRow token includes a column bitmap. In one actual embodiment of the invention, the adtgOriginalResultsetRow token includes the following fields:

| Field | Contents |
| --- | --- |
| wType | Identifies the following data to be row data of Original type, matching the resultset layout. The value is fixed to be 'ADTG_ORIGINALRESULTSETROW' |
| wPresenceMap | Bitmap that contains 1 bit for each nullable column in the row data. This bit is set to 1 if a value is present in that column, or zero if the value is null. The length of the presenceMap is variable because it contains as many Unsigned Integers (UI1s) as are necessary to map 1 bit for all permitted-null columns of the table. |

Column data for all columns in the select list follow these fields.

An adtgOriginalResultsetRow token is preceded by an adtgCachedResultDescriptor, adtgResultsetContext, adtgColumnDescriptor or another Row token. An adtgOriginalResultsetRow token is followed by another Row, adtgResultDescriptor, or adtgCachedResultDescriptor token that relates to the next resultset in the ADTG message.

The adtgOriginalResultsetRow token is used to identify rows; that have not been altered since they were last queried from the underlying datasource. The data that follows contains all columns that are part of the resultset; the columns are not separated by base tables. So the ADTG message generated as a result of a Select statement by the datasource only contains tokens of type adtgOrigintilResultsetRow (or adtgOriginalBaseTableRow and adtgNormalizedRow, if the wNormalizedFlag in adtgResultDescriptor is set. See below). Also the update ADTG message transporting client updates to the datasource may contain tokens of type adtgOriginalResultsetRow (or adtgBaseTableRow and adtgNormalizedRow), if the server also needs to see rows that were not modified.

adtgOriginalBaseTableRow Token

The adtgOriginalBaseTableRow token is a general purpose token that identifies the base table the following row of data belongs to and the specific row in the base table. In addition to fields that represent type, base table, and base table row, the adtgOriginalBaseTableRow token includes a column bitmap. In one actual embodiment of the invention, the adtgOriginalBaseTableRow token includes the following fields:

| Field | Contents |
| --- | --- |
| wType | Identifies the following data to be row data of Original type for columns belonging to a base table. The value is fixed to be 'ADTG_ORIGINALBASETABLEROW' |
| wTableOrdinal | Identifies the base table that the following row belongs to. |
| dwRowSeq | A 4-byte row sequence that uniquely identifies a row in the base table. It is generated by the marshaled and used to keep track of the base table rows that have already been transported. When the resultset is of the Keyset type, the marshaled only sends normalized rows over the network. For example in multi-table joins, the base table rows of each table are sent only once rather than every time they appear in the resultset. So for resultset rows that contain a base table row multiple times, the marshaled only sends the computed columns along with these row sequences for every base table row in the adtgNormalizedRow token. |
| wPresenceMap | Bitmap that contains 1 bit for each nullable column in the row data. This bit is set to 1 if a value is present in that column, or zero if the value is null. The length of the presenceMap is variable because it contains as many UI1s as are necessary to map 1 bit for all permitted-null columns of the table. |

Column data for all columns of the identified base table that are part of the original select list follow these fields.

An adtgOriginalBaseTableRow token is preceded by an adtgCachedResultDescriptor, adtgResultsetContext, adtgColumnDescriptor, or another Row token. An adtgOriginalBaseTableRow token is followed by another Row, or adtgResultDescriptor, or adtgCachedResultDescriptor token that relates to the next resultset in the ADTG message.

The adtgOriginalBaseTableRow token is used to identify rows; that have not been altered since they were last queried from the underlying datasource. Sending an adtgOriginalBaseTableRow token means that the rows have been separated into base table column groups, each of which is composed separately. As a result, the ADTG message generated as a result of a Select statement by the datasource only contains tokens of type adtgOriginalBaseTableRow and adtgNormalizedRow (the wNormalizedFlag in adtgResultDescriptor must be set). Also the update ADTG message transporting client updates to the datasource may contain tokens of type adtgOriginalBaseTableRow and adtgONormalizedRow, if the server also needs to see rows that were not modified.

adtgNormalizedRow Token

As noted above, the adtgNormalizedRow token is a general purpose token that contains compact information about the row being marshaled. The adtgNormalizedRow token only contains the data for the computed columns along with row sequences identifying base table rows that already have been marshaled. In addition to a type field, the adtgNormalizedRow token includes a row identifying array and a bitmap array. In one actual embodiment of the invention, the adtgNormalizedRow token includes the following fields:

| Field | Contents |
| --- | --- |
| wType | Identifies the following data to be row data of Normalized type. The value is fixed to be 'ADTG_NORMALIZEDROW'. |
| dwRowSeq | An array, each element of which uniquely identifies a row from a base table involved in the resultset. The size of the array is equal to the number of adtgTableDescriptors that have been received. The 4-byte row sequence number is generated by the marshaled and is associated to a base table row in the adtgOriginalBaseTableRow token, that must have already been transported. The occurrence of row sequences in the array is in the order of base table ordinals (defined in their table descriptors). |
| wBaseTable-UpdateMap | Bitmap array that contain one bit for every base table involved in the join. It is used to tag a resultset row with base table adtgChange tokens. A value of 1 in the bit means that the update to the corresponding base table row has been made through the resultset row represented by this adtgNormalizedRow token. The number of UI1s in the array is known from the number of base tables pointed to by the normalized row. For the results of the query (not marshaling updates), all bits have the value 0. |

Column data for all computed columns follow the foregoing fields.

An adtgNormalizedRow token is preceded by an adtgOriginallaseTableRow or adtgNormalizedRow token. An adtgNormalizedRow token is followed by another Row, adtgResultDescriptor, or adtgCacheResultDescriptor token that relates to the next resultset in the ADTG message.

The adtgNormalizedRow token contains the row sequences for all the base table rows that have already been received with their adtgOriginalBaseTableRow tokens, followed by the data for all the computed columns. Thus, if the following resultset is being marshaled in a keyset type of resultset, the related part of the resultant ADTG message will look as follows:

1. <Base table 1, row 1> <Base Table 2, row 1> <computed column 1>
2. <Base table 1, row 1> <Base Table 2, row 2> <computed column 1>
3. <Base table 1, row 1> <Base Table 2, row 3> <computed column 1>
4. <Base table 1, row 2> <Base Table 2, row 1> <computed column 1>
5. <Base table 1, row 2> <Base Table 2, row 2> <computed column 1>

<adtgHeader>
<adtgHandlerOptions>
<adtgResultDescriptor>
<adtgTableDescriptor for base table 1>
<adtgTableDescriptor for base table 2>
<adtgColumnDescriptor for computed column 1>
<adtgColumnDescriptor for base table 1, column 1>
<adtgColumnDescriptor for base table 1, column 2>
. . .
<adtgColumnDescriptor for base table 2, column 1>
<adtgColumnDescriptor for base table 2, column 2>
. . .
<adtgOriginalBaseTableRow for base table 1, row 1>
<adtgOriginalBaseTableRow for base table 1, row 2>
<adtgOriginalBaseTableRow for base table 2, row 1>
<adtgOriginalBaseTableRow for base table 2, row 2>
<adtgOriginalBaseTableRow for base table 2, row 3>
<adtgNormalizedRow for resultset row 1>
<adtgNormalizedRow for resultset row 2>

<adtgNormalizedRow for resultset row 3>
<adtgNormalizedRow for resultset row 4>
<adtgNormalizedRow for resultset row 5>
<adtgDone>

Each of the adtgNormalizedRow tokens will contain data for the computed column along with row sequences for the base table rows. The format of the ADTG message is designed to marshal results of a query into a message to be transmitted from the server to the client and also to marshal rowsets containing updated rows into a message to be transmitted from the client to the server. The rowsets may be composed of columns belonging to different base tables (created using SQL joins). When clients update rows, they do it through the rows displayed using rowsets or recordsets (the base table views are hidden from them). When marshaling update information, not only the updates need to identify the base table rows that were updated, but also the individual resultset rows which the client used to make the update. This makes it possible to recreate the state of the rowset/recordset on the server side. The wBaseTableUpdateMap is used to tie a normalized row that represents rows in the resultset to an updated base table row.

adtgDelete Token

The adtgDelete token is a special token that identifies the following row data to be delete type data. In addition to a type field, the adtgDelete token includes a field that identifies the table the following row belongs to and a bitmap. In one actual embodiment of the invention, the adtgDelete token includes the following fields:

| Field | Contents |
|---|---|
| wType | Identifies the following data to be row of Delete type. The value is fixed to be 'ADTG_DELETE' |
| wTableordinal | Identifies the table that the following row belongs to. |
| wKeyPresence-Map | Bitmap that contains 1 bit for each nullable key column in the row data. This bit is set to 1 if a value is present in that column, or zero if the value is null. The length of the keyPresenceMap is variable because it contains as many UI1s as are necessary to map 1 bit for all permitted-null, key columns of the table. Provision is made for key columns to be null because the table may be denormalized. |

Column data for key and version columns follow the foregoing fields.

An adtgDelete token is preceded by an adtgCachedResultDescriptor, adtgResultsetContext, adtgColumnDescriptor, or another Row token. An adtgDelete token is followed by another Row, adtgResultDescriptor or adtgCachedResultDescriptor token related to the next resultset in the ADTG message.

An adtgDelete token only identifies the key columns, followed by the version columns (ISROWVER flagged columns), and the keyPresenceMap is only as large as needed for those columns. Otherwise, the adtgDelete token follows the rules of adtgoriginal.

adtgChange Token

The adtgChange token is a special token that identifies the following row data to be change type data. In addition to a type field, the adtgChange token includes a field that identifies the table the row belongs to and associated bitmaps. In one actual embodiment of the invention, the adtgchange token includes the following fields:

| Field | Contents |
|---|---|
| wType | Identifies the following data to be row data of Change type. The value is fixed to be 'ADTG_CHANGE'. |
| wTableOrdinal | Identifies the table that the following row belongs to. When sending update tablegram in an unnormalized mode, the wTableOrdinal is left NULL. In this case the adtgChange row refers to the resultset row. If the adtgChange token is tied to a base table row, the base table is identified by wTableOrdinal. |
| wKeyPresence-Map | Bitmap that contains 1 bit for each nullable key column in the row data. This bit is set to 1 if a value is present in that column, or zero if the value is null. The length of the keyPresenceMap is variable because it contains as many UI1s as are necessary to map 1 bit for all permitted-null, key columns of the table. Provision is made for key columns to be null because the table may be denormalized. |
| wUpdateMap | Bitmap that contains 1 bit for each column of the table that has an updated value. This bit is set to 1 if a value is present in that column or if it is to be explicitly updated to null; it is set to zero if the value is not being modified. The length of the update map is equal to the number of columns in the base table descriptor. |
| wForceNullMap | Bitmap that contains 1 bit for each column that is permitted to be null. This bit is set to 1 if the column is to be explicitly updated to null. Not setting the wForceNullMap bit and the wPresenceMap bit means that the value is not to be changed. The length of the ForceNullMap is variable because it contains as many UI1s as are necessary to map 1 bit for all such columns in the adtgChange token. |

An adtgchange token is preceded by an adtgCachedResultDescriptor, adtgResultsetContext, adtgColumnDescriptor, or another Row token. An adtgChange token is followed by another Row, adtgResultDescriptor, or adtgCachedResultDescriptor token related to the next resultset in the ADTG message.

An adtgChange token contains first the key columns then the version columns, similar to an adtgDelete token, and then the data column. A version (ISROWVER) column never appears in the data columns. If the table has a version column, then its inclusion is mandatory. All other data columns, including key columns, are optionally supplied as changed values, and so the presence map must have enough bits for all. No element is present in the data stream for columns where the presence bit is not set.

adtginsert Token

The adtginsert token is a special token that identifies the following row data to be insert type data. In addition to a type field, the adtginsert token includes a field that identifies the table the following row belongs to and related bitmaps. In one actual embodiment of the invention, the adtginsert token includes the following fields:

| Field | Contents |
|---|---|
| wType | Identifies the following data to be row data of Insert type. The value is fixed to be 'ADTG_INSERT'. |
| wTableOrdinal | Identifies the table that the following row belongs to. |
| wPresenceMap | Bitmap that contains 1 bit for each nullable column in the row data. This bit is set to 1 if a value is present in that column, or zero if the value is null. The length of the presenceMap is variable because it contains as many UI1s as are necessary to map 1 bit for all permitted-null columns of the table. |

-continued

| Field | Contents |
| --- | --- |
| wSetDefault-MAP | Bitmap that contains 1 bit for all columns that are to be set to the DEFAULT value in the inserted row. |

Column data for all columns of the base table row follow the following fields.

An adtginsert token is preceded by an adtgCachedResultDescriptor, adtgResultsetContext, adtgColumnDescriptor, or another Row token. An adtgInsert token is followed by another Row, adtgResultDescriptor, or adtgCachedResultDescriptor token related to the next resultset in the ADTG message. The adtgInsert tokens are used to send new rows inserted by the client to the datasource.

adtgReadVerify Token

The adtgReadVerify token is a special token that identifies the following row data to be of the read and verify type. In addition to a type field, the adtgReadVerify token includes a related bitmap. In one actual embodiment of the invention, the adtgReadVerify token includes the following fields:

| Field | Contents |
| --- | --- |
| wType | Identifies the following data to be row data of ReadVerify type. The value is fixed to be 'ATDG_READVERIFY'. |
| wTableOrdinal | Identifies the table that the following row belongs to. |
| wKeyPresence-Map | Bitmap that contains 1 bit for each nullable key column in the row data. The bit is set to 1 if a value is present in that column, or zero if the value is null. The length of the keyPresenceMap is variable because it contains as many UI1s as are necessary to map 1 bit for all permitted-null, key columns of the table. Provisions is made for key columns to be null because the table may be denormalized. |

Column data for key and version columns follow the foregoing fields.

An adtgReadVerify token is preceded by an adtgCachedResultDescriptor, adtgResultsetContext, adtgColumnDescriptor, or another Row token. An adtgReadVerify token is followed by another Row, adtgResultDescriptor, or adtgCachedResultDescriptor token related to the next resultset in the ADTG message. The adtgReadVerify tokens are used to verify the currency of rows by the client. The format of the adtgReadVerijy tokens matches exactly the format of the adtgDelete tokens except that the type is ADTG_READVERIFY. Version columns are used to verify any changes that may have taken place without the client's knowledge.

Data Elements

The data elements that follow the Rows section tokens, preferably, follow the following rules:

No element occurs at all for key or regular columns which are nullable and for which a presence bit is not set.

The individual columns of the row are in the order of column ordinals which identify their positions in the resultset.

If the maximum width of the variable length field exceeds some predetermined value, e.g., is <=255 UI1s, then the length which precedes it shall be a UI1 (unsigned I1). Otherwise, the length shall be a UI4. It should be noted that ADTG messages are fully Unicode compliant. For STRs and WSTRs, the length is represented in number of characters and not in number of bytes.

For fixed length STRs and WSTRs, if the length of the column is x characters, then the ADTG message contains a value of x in the dwMaxLength field of the adtgColumnDescriptor token.

For variable length STRs and WSTRs, length is again represented by number of characters. If the maximum number of characters allowed in the column is less than a predetermined value, e.g., 255, then there is 1 byte (UI1) field sent before the actual value containing the length in number of characters; otherwise a 4 byte (UI4) field is used to specify the total number of characters.

The packing alignment for all data elements in ADTG messages is always UI1.

BLOBs or Large Text

Preferably, BLOB or large text is in general partially delivered inline and partially deferred. A BLOB element includes several fields that define length and URL. In one actual embodiment of the invention, BLOB elements include the following fields:

| Field | Contents |
| --- | --- |
| wURLLength | Contains the length of the field containing the URL that identifies the BLOB. |
| wURL | Uniquely identifies a persistent object (cookie) that is the BLOB. |
| wFirstLength | Length of the field containing the number of bytes to be retrieved from the BLOB. |
| wFirstPart | Identifies the length of the BLOB that will be retrieved. |

The URL is intended to be used to retrieve the rest of the BLOB (URL may just be a string containing a file name in the non-HTTP case). If the server cannot guarantee that the URL will retrieve an unchanged version of the BLOB, the "URL" should include a version identifier. Likely this can be used to guard the client against undetected version changes.

Preferably, if the server wishes to offer the client a way to negotiate the presence and size of firstParts of BLOBs, then it is free to define such parameterization. How this is accomplished does not form part of this invention.

End Section

As noted above and illustrated in FIG. 3, the End Section includes a single token designated the adtgDone token. A suitable adtgDone token is described below:

adtgDone token

The adtgDone token 380 establishes the end of the current resultset or the entire tablegram. In this regard, in addition to type and length fields, an adtgDone token includes a status field that is used to indicate if there are more resultsets in the ADTG message or if the token is at the end of the ADTG message. In one actual embodiment of the invention, the adtgDone token includes the following fields:

| Field | Contents |
| --- | --- |
| wType | Identifies the following data to be a Done token. The value is fixed to be 'ADTG_DONE'. |
| wLength | Contains the length of the adtgDone. The length of the adtgDone is fixed at 8 bytes for the current release. |
| wStatus | Contains information that specifies if the TableGram contains more than 1 resultset. If it contains only 1 resultset, then this is the last token in the stream; otherwise, it is followed by the adtgResultDescriptor for the next resultset. It can contain the following values: |

-continued

| Field | Contents |
|---|---|
| | 0x00 - End of the ADTG message stream (there are no more resultsets).<br>0x01 - End of the current resultset. This token will be followed by the adtgResultDescriptor for the next resultset. |
| wReserved | Bytes reserved for future use; also used to round up the token length to the desired byte length. |

An adtgDone token is preceded by Row token data. An adtgDone token is followed by nothing, or adtgResultDescriptor, or adtgCachedResultDescriptor tokens related to the next resultset in the ADTG message.

In summary, the invention provides a data message format called the Advanced Data TableGram (ADTG) format that is ideally suited for use in marshaling tabular data for transfer between systems, in particular disconnected networks such as the Internet. More specifically, ADTG formatted messages are especially suitable for the flow of tabular data in both directions between a client browser and a server using the HTTP protocol of the WWW. The Advanced Data TableGram format can be used as the wire format for marshaling resultsets of relational database queries, table rows containing updates made to them by applications, and status information for each row that contained the changes. Each token of an ADTG message is self-contained with a header that provides the names, types, and optional descriptions of the rows being transferred, then the new or changed data in the rows. In addition to the types of data and resultsets described herein, those skilled in the art will readily appreciate that the Advanced Data TableGram format may be extended to data models without departing from the spirit and scope of the invention.

The invention, while being described in terms of its application to the Internet, is also intended to be used with DCOM, the Distributed Component Object Model, by Microsoft Corporation of Redmond, Wash. DCOM extends component software technology, i.e., the idea of breaking large, complex software applications into a series of prebuilt and easily developed, understood, and changed software modules called components, to a distributed environment. With DCOM, distributed components making up a particular application may exist at different specific locations. Developers of applications or other components that require a distributed component need only find the component and then use it. The developer does not need to compile or recompile the component. This is done by the creators of the component. Thus, the latest and greatest version of each component is always available to developers and other users.

While the invention has been described in connection with disconnected networks, such as the Internet, as noted above, it can be used with other types of networks, such as local area networks and wide area networks both connected and disconnected. Hence, within the scope of the appended claims, it is to be understood that the invention can be practiced otherwise than as specifically described herein.

The embodiments of the invention in which an exclusive property or privilege is claimed are defined as follows:

1. A computer-readable medium having stored thereon data formatted into a tabular data stream containing rows of data suitable for transmission between a client computer and a server computer through a network, said tabular data stream format comprising:

(a) a first section including data representing global parameters for said tabular data stream;

(b) a second section including data representing parameters for controlling the processing of the tabular data stream by a process receiving the tabular data stream;

(c) a third section including data representing properties of the tabular data stream;

(d) a fourth section including data representing the properties of rows and the values of columns of the tabular data stream; and:

(e) a fifth section including data that represents the end of the tabular data stream.

2. A computer-readable medium having stored thereon data formatted into a tabular data stream suitable for transmission between a client computer and a server computer through a network as claimed in claim 1, wherein said first section comprises a Header section including a token having fields that contain said data representing global parameters for said tabular data stream.

3. A computer-readable medium having stored thereon data formatted into a tabular data stream suitable for transmission between a client computer and a server computer through a network as claimed in claim 1, wherein said second section comprises a HandlerOptions section including a token having fields that contain said data representing parameters for controlling the processing of the tabular data stream by a process receiving the tabular data stream.

4. A computer-readable medium having stored thereon data formatted into a tabular data stream suitable for transmission between a client computer and a server computer through a network as claimed in claim 1, wherein said third section comprises a Descriptors section including:

(a) a token having fields containing data representing the general properties of the tabular data stream;

(b) at least one token having fields containing data representing properties of tables from which the tabular data stream originated; and (c) at least one token having fields containing data representing properties of columns of the tabular data stream.

5. A computer-readable medium having stored thereon data formatted into a tabular data stream suitable for transmission between a client computer and a server computer through a network as claimed in claim 4, wherein said Descriptors section also includes a token having fields containing data representing options/properties unique to the tabular data stream.

6. A computer-readable medium having stored thereon data formatted into a tabular data stream suitable for transmission between a client computer and a server computer through a network as claimed in claim 1, wherein said third section comprises a Descriptors section including a token having a field containing data that uniquely identifies cached data.

7. A computer-readable medium having stored thereon data formatted into a tabular data stream suitable for transmission between a client computer and a server computer through a network as claimed in claim 6, wherein said Descriptors section also includes a token having fields containing data representing options/properties unique to said cached data.

8. A computer-readable medium having stored thereon data formatted into a tabular data stream suitable for transmission between a client computer and a server computer through a network as claimed in claim 1, wherein said fourth section comprises a Row section including a token that identifies the nature of data rows contained in said tabular data stream.

9. A computer-readable medium having stored thereon data formatted into a tabular data stream suitable for transmission between a client computer and a server computer through a network as claimed in claim 8, wherein said data rows contained in said tabular data stream are identified as an original resultset row.

10. A computer-readable medium having stored thereon data formatted into a tabular data stream suitable for transmission between a client computer and a server computer through a network as claimed in claim 8, wherein said data rows contained in said tabular data stream are identified as an original base table row.

11. A computer-readable medium having stored thereon data formatted into a tabular data stream suitable for transmission between a client computer and a server computer through a network as claimed in claim 8, wherein said data rows contained in said tabular data stream are identified as a normalized row.

12. A computer-readable medium having stored thereon data formatted into a tabular data stream suitable for transmission between a client computer and a server computer through a network as claimed in claim 1, wherein said fourth section comprises a Row section including a token that identifies a data row contained in said tabular data stream as delete type data.

13. A computer-readable medium having stored thereon data formatted into a tabular data stream suitable for transmission between a client computer and a server computer through a network as claimed in claim 1, wherein said fourth section comprises a Row section including a token that identifies a data row contained in said tabular data stream as change type data.

14. A computer-readable medium having stored thereon data formatted into a tabular data stream suitable for transmission between a client computer and a server computer through a network as claimed in claim 1, wherein said fourth section comprises a Row section including a token that identifies a data row contained in said tabular data stream as insert type data.

15. A computer-readable medium having stored thereon data formatted into a tabular data stream suitable for transmission between a client computer and a server computer through a network as claimed in claim 1, wherein said fourth section comprises a Row section including a token that identifies a data row contained in said tabular data stream as read/verify type data.

16. A computer-readable medium having stored thereon data formatted into a tabular data stream suitable for transmission between a client computer and a server computer through a network as claimed in claim 1, wherein said fifth section comprises an End section including a token that either establishes the end of a part of the tabular data stream or identifies the end of the entire tabular data stream.

17. A computer-readable medium having stored thereon data formatted into a tabular data stream suitable for transmission between a client computer and a server computer through a network as claimed in claim 1, wherein said third section comprises a Descriptor section including a 16-byte unique identifier.

18. A method of creating a tabular data stream for sending rows of data between a client computer and a server computer through a network, said method comprising:
  (a) packaging data representing global parameters for the tabular data stream into a first section;
  (b) packaging data representing parameters for controlling the processing of the tabular data stream by a process receiving the tabular data stream into a second section immediately following the first section;
  (c) packaging data representing properties of the tabular data stream into a third section immediately following the second section;
  (d) packaging data representing properties of rows and values of columns of the tabular data into a fourth section immediately following the third section; and
  (e) packaging data representing an end of the tabular data stream into a fifth section immediately following the fourth section.

19. The method claimed in claim 18, wherein said first section comprises a Header section including a token having fields that contain said data representing global parameters for the tabular data stream.

20. The method claimed in claim 18, wherein said second section comprises a HandlerOptions section including a token having fields that contain data representing parameters for controlling the processing of the tabular data stream by a process receiving the tabular data stream.

21. The method claimed in claim 18, wherein said third section comprises a Descriptors section including:
  (a) a token having fields containing data representing the general properties of the tabular data stream;
  (b) at least one token having fields containing data representing properties of tables from which the tabular data stream originated; and
  (c) at least one token having fields containing data representing properties of columns of the tabular data stream.

22. The method claimed in claim 21, wherein said Descriptors section also includes a token having fields containing data representing options/properties unique to the tabular data stream.

23. The method claimed in claim 18, wherein said third section comprises a Descriptors section including a token having a field containing data that uniquely identifies cached data.

24. The method claimed in claim 23, wherein said Descriptors section also includes a token having fields containing data representing options/properties unique to the tabular data stream.

25. The method claimed in claim 18, wherein said fourth section comprises a Row section including a token that identifies the nature of data rows contained in said tabular data stream.

26. The method claimed in claim 25, wherein said data rows contained in said tabular data stream are identified as original resultset row.

27. The method claimed in claim 25, wherein said data rows contained in said tabular data stream are identified as original base table row.

28. The method claimed in claim 25, wherein said data rows contained in said tabular data stream are identified as normalized row.

29. The method claimed in claim 18, wherein said fourth section comprises a Row section including a token that identifies a data row contained in said tabular data stream as delete type data.

30. The method claimed in claim 18, wherein said fourth section comprises a Row section including a token that identifies a data row contained in said tabular data stream as change type data.

31. The method claimed in claim 18, wherein said fourth section comprises a Row section including a token that identifies a data row contained in said tabular data stream as inert type data.

32. The method claimed in claim 18, wherein said fourth section comprises a Row section including a token that identifies a data row contained in said tabular data stream as read/verify type data.

33. The method claimed in claim 18, wherein said fifth section comprises an End section including a token that either establishes the end of a part of the tabular data stream or identifies the end of the entire tabular data stream.

34. A method of querying a database through a network, wherein the database is associated with a server computer running a server process, the server computer connected to, and in communication with, a client computer through a network, the method comprising the steps of:
   (a) issuing, by a client process running on a client computer, a query for data from a database;
   (b) sending the query from the client computer to the server computer;
   (c) processing the query, by the server process running on the client computer, and retrieving rows of data satisfying the query from one or more tables of the database;
   (d) forming a Rowset containing the retrieved rows and metadata concerning the retrieved rows;
   (e) packaging the Rowset into a message comprising a tabular datastream format suitable for marshaling tabular data for transfer between the client computer and the server computer; and
   (f) sending the message to the client computer.

35. The method of claim 34, wherein the tabular datastream format comprises:
   (a) a first section including data representing global parameters for said tabular data stream;
   (b) a second section including data representing parameters for controlling the processing of the tabular data stream by a process receiving the tabular data stream;
   (c) a third section including data representing properties of the tabular data stream;
   (d) a fourth section including data representing the properties of rows and the values of columns of the tabular data stream; and
   (e) a fifth section including data that represents the end of the tabular data stream.

36. The method claimed in claim 35, wherein said first section comprises a Header section including a token having fields that contain said data representing global parameters for the tabular data stream.

37. The method claimed in claim 35, wherein said second section comprises a HandlerOptions section including a token having fields that contain data representing parameters for controlling the processing of the tabular data stream by a process receiving the tabular data stream.

38. The method claimed in claim 35, wherein said third section comprises a Descriptors section including:
   (a) a token having fields containing data representing the general properties of the tabular data stream;
   (b) at least one token having fields containing data representing properties of tables from which the tabular data stream originated; and
   (c) at least one token having fields containing data representing properties of columns of the tabular data stream.

39. The method claimed in claim 38, wherein said Descriptors section also includes a token having fields containing data representing options/properties unique to the tabular data stream.

40. The method claimed in claim 35, wherein said third section comprises a Descriptors section including a token having a field containing data that uniquely identifies cached data.

41. The method claimed in claim 40, wherein said Descriptors section also includes a token having fields containing data representing options/properties unique to the tabular data stream.

42. The method claimed in claim 35, wherein said Row section includes a token that identifies a data row contained in said tabular data stream as delete type data.

43. The method claimed in claim 35, wherein said Row section includes a token that identifies a data row contained in said tabular data stream as change type data.

44. The method claimed in claim 35, wherein said fourth section comprises a Row section including a token that identifies a data row contained in said tabular data stream as insert type data.

45. The method claimed in claim 35, wherein said fourth section comprises a Row section including a token that identifies a data row contained in said tabular data stream as read/verify type data.

46. The method claimed in claim 35, wherein said fifth section comprises an End section including a token that either establishes the end of a part of the tabular data stream or identifies the end of the entire tabular data stream.

47. The method claimed in claim 35, wherein said fourth section comprises a Row section including a token that identifies the nature of data rows contained in said tabular data stream.

48. The method claimed in claim 47, wherein said data rows contained in said tabular data stream are identified as an original resultset row.

49. The method claimed in claim 47, wherein said data rows contained in said tabular data stream are identified as an original base table row.

50. The method claimed in claim 47, wherein said data rows contained in said tabular data stream are identified as a normalized row.

51. The method of claim 34, further comprising the step of updating the database through the network, wherein the step of updating the database comprises the steps of:
   (a) recreating, by the client process, the Rowset from the message;
   (b) manipulating, by the client process, contents of the recreated Rowset;
   (c) creating an updated Rowset containing updated rows and updated metadata concerning the updated rows resulting from manipulating the contents of the recreated Rowset;
   (d) packaging the updated Rowset into a message comprising a tabular datastream format suitable for marshaling tabular data for transfer between the client computer and the server computer; and
   (e) sending the message to the server computer;
   (f) recreating, by the server process, the updated Rowset from the message; and
   (g) updating the database with the updated Rowset.

52. A computer-readable medium having computer-executable instructions for performing the steps of:
   (a) issuing, by a client process running on a client computer, a query for data from a database;
   (b) sending the query from the client computer to the server computer;
   (c) processing the query, by the server process running on the client computer, and retrieving rows of data satisfying the query from one or more tables of the database;
   (d) forming a Rowset containing the retrieved rows and metadata concerning the retrieved rows;

(e) packaging the Rowset into a message comprising a tabular datastream format suitable for marshaling tabular data for transfer between the client computer and the server computer; and (f) sending the message to the client computer.

53. A method of transmitting computer-executable instructions for performing the steps of:

(a) issuing, by a client process running on a client computer, a query for data from a database;

(b) sending the query from the client computer to the server computer;

(c) processing the query, by the server process running on the client computer, and retrieving rows of data satisfying the query form one or more tables of the database;

(d) forming a Rowset containing the retrieved rows and metadata concerning the retrieved rows;

(e) packaging the Rowset into a message comprising a tabular datastream format suitable for marshaling tabular data for transfer between the client computer and the server computer; and (f) sending the message to the client computer.

* * * * *

UNITED STATES PATENT AND TRADEMARK OFFICE
CERTIFICATE OF CORRECTION

PATENT NO. : 5,974,416
DATED : October 26, 1999
INVENTOR(S) : T.K. Anand et al.

It is certified that error appears in the above-identified patent and that said Letters Patent is hereby corrected as shown below:

Column 1,
Line 16, "cotuntless" should read -- countless --
Line 25, "An examples" should read -- An example --
Line 29, "docuinents" should read -- documents --
Line 42, "client's" should read -- clients --

Column 2,
Line 13, "(ADIG)" should read -- (ADTG) --
Line 22, after "for example" insert -- , --

Column 4,
Line 31, "called "server"." should read -- called "server"). --
Line 63, after "specifically" delete ","

Column 5,
Line 10, "ProgrammrLing" should read -- Programming --
Line 15, "c.lient" should read -- client --
Line 50, "Rtowsets" should read -- Rowsets --

Column 6,
Line 3, "foi" should read -- for --
Line 51, "adtgNormalihzedRow" should read -- adtgNormalizedRow --
Lines 62-63, "adtginsert" should read -- adtgInsert --

Column 7,
Line 16, "foll.owed" should read -- followed --

Column 8,
Line 10, after "from" delete "."

Column 9,
Line 18, (Table, Line 25) "verision" should read -- version --
Line 59, "th is" should read -- this --
Line 59, "un a rshaling" should read -- unmarshaling --
Line 61, "arid" should read -- and --
Line 64, "wupdate TableGramType" should read -- wUpdateTableGramType --

Column 10,
Line 9, "OriginalUrl" should read -- OriginUrl --
Line 14, before "Corporation" delete "("

UNITED STATES PATENT AND TRADEMARK OFFICE
CERTIFICATE OF CORRECTION

PATENT NO.   : 5,974,416
DATED        : October 26, 1999
INVENTOR(S)  : T.K. Anand et al.

It is certified that error appears in the above-identified patent and that said Letters Patent is hereby corrected as shown below:

Column 11,
Line 10, (Table, Line 23) "0 x03" should read -- 0x03 --
Line 20, (Table, Line 36) "0x0" should read -- 0x00 --
Line 29, (Table, Line 47) "nVisible-Columns" should read -- nVisibleColumns --

Column 12,
Line 21, (Table, Line 9) after "uniquely identifies a" insert -- previously cached --
Line 25, "resultst" should read -- resultset --
Line 40, before "extended" insert -- more --
Line 47, "adtgTableDescriptor" (first instance) should read -- adtgResultDescriptor --
Line 49, "350, 360 and 370" should read -- 330, 350 and 360 --

Column 13,
Line 33, "adtgResultsetConiext" should read -- adtgResultsetContext --
Line 47, "codepage" should read -- codePage --

Column 14,
Line 27, after "above," insert -- an --
Line 42, "columns" should read -- column --

Column 15,
Line 29, "has value" should read -- has the value --
Line 35, "table describe" should read -- table describes --
Line 45, "Row section" should read -- Rows section --
Line 64, "adtginsert" should read -- adtgInsert --

Column 16,
Line 45, after "rows" delete ";"
Line 50, "adtgOrigintilResultsetRow" should read -- adtgOriginalResultsetRow --

Column 17,
Line 11, (Table, Line 10) "marshaled" should read -- marshaler --
Line 13, (Table, Line 12) "marshaled" should read -- marshaler --
Line 17, (Table, Line 17) "marshaled" should read -- marshaler --
Line 35, after "rows" delete ";"
Line 41, "of type" should read -- of the type --
Line 46, "adtgONormalizedRow," should read -- adtgNormalizedRow, --

UNITED STATES PATENT AND TRADEMARK OFFICE
CERTIFICATE OF CORRECTION

PATENT NO. : 5,974,416
DATED : October 26, 1999
INVENTOR(S) : T.K. Anand et al.

It is certified that error appears in the above-identified patent and that said Letters Patent is hereby corrected as shown below:

Column 18,
Line 5, (Table, Line 10) "marshaled" should read -- marshaler --
Lines 22-23, "adtgOriginallaseTableRow" should read -- adtgOriginalBaseTableRow --

Column 19,
Line 35, (Table, Line 2) after "row" insert -- data --
Line 37, (Table, Line 5) "wTableordinal" should read -- wTableOrdinal --
Line 42, (Table, Line 11) "keyPresenceMap" should not begin a new line
Line 60, "adtgoriginal" should read -- adtgOriginal --
Line 66, "adtgchange" should read -- adtgChange --

Column 20,
Line 31, "in the adtgChange token" should not begin a new line
Line 33, "adtgchange" should read -- adtgChange --
Line 48, "adtginsert" should read -- adtgInsert --
Line 49, "adtginsert" should read -- adtgInsert --
Line 51, "adtgisert" should read -- adtgInsert --
Line 53, "adtginsert" should read -- adtgInsert --

Column 21,
Line 10, "adtginsert" should read -- adtgInsert --
Line 48, "adtgReadVerijy" should read -- adtgReadVerify --
Line 62, "UI1s," should read -- UI1s, --

Signed and Sealed this

Thirteenth Day of November, 2001

Attest:

Nicholas P. Godici

NICHOLAS P. GODICI
Attesting Officer
Acting Director of the United States Patent and Trademark Office